D. T. HUOT.
CLUTCH.
APPLICATION FILED AUG. 31, 1915.

1,200,945.

Patented Oct. 10, 1916.

Inventor:

David T. Huot

UNITED STATES PATENT OFFICE.

DAVID T. HUOT, OF PROVIDENCE, RHODE ISLAND.

CLUTCH.

1,200,945.  Specification of Letters Patent.  Patented Oct. 10, 1916.

Application filed August 31, 1915. Serial No. 48,369.

*To all whom it may concern:*

Be it known that I, DAVID T. HUOT, a citizen of the United States, residing at 340 Manton avenue, in the city of Providence, county of Providence, and State of Rhode Island, have invented a new and useful Clutch Used on Looms, of which the following is a specification.

My invention relates to improvements in clutches used in operating looms in weaving cloth; and the objects of my improvements are, first, to produce a clutch in two parts, so that packing in the bore may be eliminated; second, to produce a clutch that will work readily, and that will not skip when in operation; third, to produce a clutch that may be used with either round shafts or shafts having a square end; fourth, to prolong the life of the clutch. I attain these objects by the mechanism illustrated in the accompanying drawings, in which—

Figure 1:
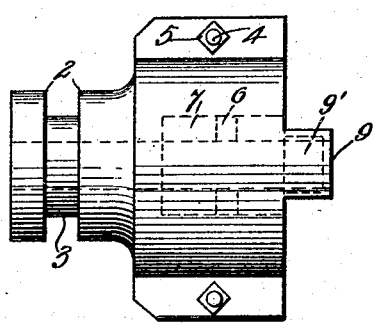
Figure 2:
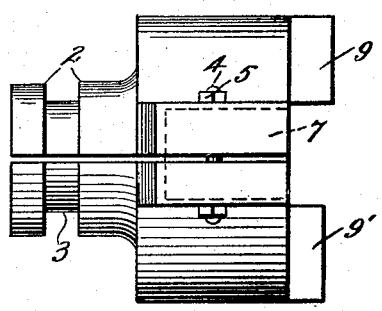
Figure 3:
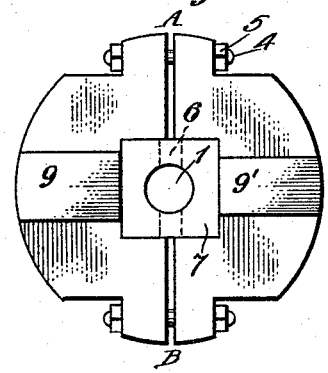
Figure 4:
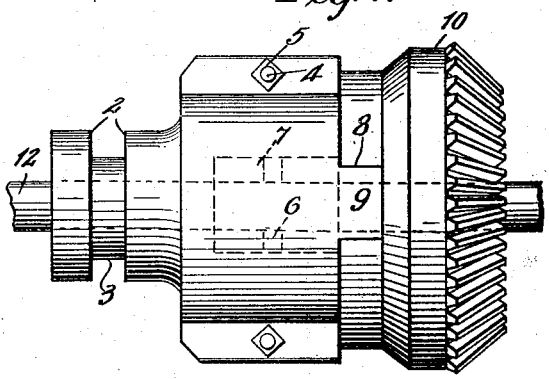
Figure 5:
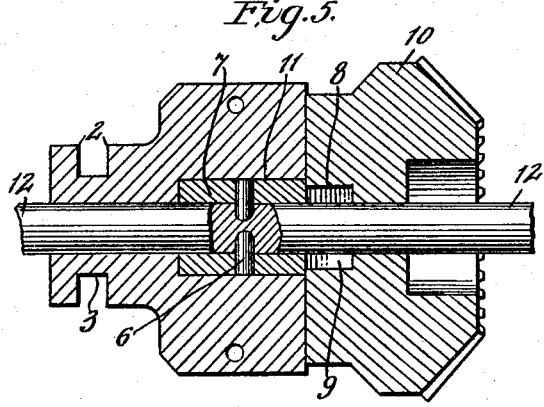
Figure 6:
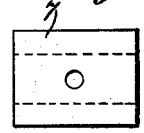
Figure 7:
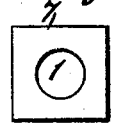

Figure 1 is a plan view of one member of the clutch. Fig. 2 is a side elevation and Fig. 3 an end view of the member shown in Fig. 1. Fig. 4 is a plan view of both the clutch member and the gear with which it operates. Fig. 5 is a longitudinal, sectional view of the clutch and gear, and this figure also includes a sectional view of the bushing. Fig. 6 is a side elevation, and Fig. 7 is an end elevation of the bushing.

Similar numerals refer to similar parts throughout the several views.

The clutch is made in two parts as shown in Figs. 1, 2, 3, 4 and is held on the shaft by means of the bolts 4.

In the several figures, 1 is the hole in the clutch, 2 is the rim of the neck, 3 is the neck on which the shipper rod operates in throwing the clutch in or out of the gear with which it is used.

4 are bolts holding the two halves of the clutch together on the shaft, and these two sections are tightened together by nuts 5.

6 are holes in the bushing into which (holes) pins are inserted to hold the bushing firmly on the shaft 12.

7 is the bushing. This bushing having a circular hole 1, allows the use of round shafting, but should a shaft having a square end be used in connection with the clutch, the bushing is removed thereby leaving a square hole or recess in the said member shown in Fig. 1 into which the end or the square portion of the shaft is inserted.

8 shows the slot in the gear as shown in Figs. 4 and 5, into which the keys 9 and 9' are inserted when the clutch member grips the gear.

9 and 9' are two keys of which 9 is wider and deeper than 9', that they may fit in their respective place in the bevel gear, the slot of which is wider and deeper at one end than at the other end. This is so arranged that the clutch will always lock at its proper place and avoid injury to the fabric in weaving.

10 is the bevel gear with which the clutch operates.

11 is the rectangular recess in the clutch member which receives the bushing when the bushing is used or the square section of the shaft, when a shaft having a square portion is utilized.

12 is the shaft upon which the clutch members are mounted.

The feature of my invention is carried out by placing the two sections of the clutch on the shaft and inserting the bolts 4 in their respective places and screwing the nuts 5 on the said bolts. It will be observed that there is a space at "A" "B," this space allows for packing so that when the two sections are bolted together they may not bear on the bushing, but will allow the longitudinal sliding of the member shown in Fig. 1. This space "A" "B," also allows tightening of bolts when the parts become worn by the longitudinal movement, thus prolonging the life of the clutch. The bushing is used in connection with round shafting only. The gear 10, is placed on the shaft, the projection of the shaft receives the bushing, which bushing is put firmly on this projection by means of pins through holes 6. When a shaft having a square end or portion is used, the bushing is not required as the said square portion of the shaft projecting beyond the gear seats into the rectangular recess in the split clutch member. The clutch member moves longitudinally along the shaft 12 on the bushing, (or the square portion of shaft as the case may be), and rotates with same. The gear is loose on the rounded end of the shaft and is operated by the clutch member when the same has been moved longitudinally so that the keys 9 of the clutch member will seat into the recesses 8 of the gear member 10.

Claims:

1. In a clutch comprising revolubly mounted members adapted for engagement, to thereby rotatively connect the same, a shaft provided with a non-circular portion, one of the members slidably mounted on said portion, said member being divided longitudinally thereby forming sections, adjustable means for connecting the sections, whereby the sections may be adjusted to compensate wear due to sliding on the portion.

2. In a clutch comprising revolubly mounted members adapted for engagement, to thereby rotatively connect the same, a shaft, a non-circular bushing fastened to said shaft, on which one of the members is slidably mounted, said member divided longitudinally thereby forming sections, means for fastening said sections together adjustably, whereby the sections may be adjusted on the bushing.

3. A split clutch member having a central bore, said bore enlarged at one end, to form a recess non-circular in cross section, and a supporting shaft having a part of corresponding cross section seated in said recess, the member being slidable on the part.

4. A jaw clutch comprising a toothed member and a correspondingly recessed member adapted to coöperate with the toothed member, one of the teeth on the toothed member being wider than the other, and one of the recesses on the other member being of a corresponding size, to receive the large tooth.

DAVID T. HUOT.

Witnesses:
HENRY PURN,
C. L. GRENIER.

Copies of this patent may be obtained for five cents each, by addressing the "Commissioner of Patents. Washington, D. C."